(12) United States Patent  (10) Patent No.: US 8,786,125 B2
Christensen  (45) Date of Patent: Jul. 22, 2014

(54) SYSTEM, METHOD AND APPARATUS FOR CAPTURING KINETIC ENERGY

(76) Inventor: Kim Christensen, Livermore, CA (US)

( * ) Notice: Subject to any disclaimer, the term of this patent is extended or adjusted under 35 U.S.C. 154(b) by 218 days.

(21) Appl. No.: 13/445,031

(22) Filed: Apr. 12, 2012

(65) Prior Publication Data

US 2012/0261924 A1 Oct. 18, 2012

Related U.S. Application Data

(60) Provisional application No. 61/474,666, filed on Apr. 12, 2011.

(51) Int. Cl.
*F03D 9/00* (2006.01)
*F03D 3/06* (2006.01)
*F03D 3/00* (2006.01)

(52) U.S. Cl.
CPC ............ *F03D 3/002* (2013.01); *F05B 2240/40* (2013.01); *Y02E 10/74* (2013.01); *F03D 3/068* (2013.01); *F05B 2210/16* (2013.01)
USPC .......................................................... 290/55

(58) Field of Classification Search
CPC .............. F03D 1/00; F03D 2/002; F03D 3/02
USPC .......................................................... 290/55
See application file for complete search history.

(56) References Cited

U.S. PATENT DOCUMENTS

| | | | |
|---|---|---|---|
| 6,476,513 B1 * | 11/2002 | Gueorguiev | 290/55 |
| 7,365,448 B2 * | 4/2008 | Stephens | 290/55 |
| 7,528,498 B2 * | 5/2009 | Yeh | 290/55 |
| 8,443,571 B2 * | 5/2013 | Tadayon | 52/745.18 |
| 8,616,829 B2 * | 12/2013 | Becker et al. | 415/3.1 |
| 2008/0258469 A1 * | 10/2008 | Stephens et al. | 290/55 |
| 2008/0273974 A1 * | 11/2008 | Becker | 416/7 |
| 2009/0108585 A1 * | 4/2009 | Tai | 290/55 |
| 2010/0230966 A1 * | 9/2010 | Pavlak | 290/44 |
| 2011/0262281 A1 * | 10/2011 | Petsche et al. | 416/223 R |

* cited by examiner

*Primary Examiner* — Truc Nguyen

(57) ABSTRACT

A kinetic energy capture device consisting of one or more wings having a high coefficient of lift and which leading edge of the wing or wings faces substantially in the direction of the wind or gas passing around the wing. The wing is designed to have a very high coefficient of lift in a low Reynolds gas or wind flow. The wing or wings are connected to a rotationally structure, which contains an axle. The axle of the kinetic energy capture device has an orientation substantially horizontal relative to the ground. The kinetic energy capture system is designed to minimize costs, minimize environmental impact, maximize reliability and optimize the production of electrical energy in a kinetic environment where the average Reynolds number is low.

28 Claims, 13 Drawing Sheets

800

| Description | Wind speed | Cord and span | Maximum lift coefficient | Maximum lift (LBF) |
|---|---|---|---|---|
| Planar, board-like structure 701 | 15 | 4 feet x 8 feet | 0.926 | 18 |
| Standard airfoil 702 | 15 | 4 feet x 8 feet | 1.017 | 18 |
| Airfoil optimized for lower wind speeds 104 | 15 | 4 feet x 8 feet | 2.523 | 46 |
| Airfoil above, with reduced thickness to cord 703 | 15 | 4 feet x 8 feet | 2.494 | 45 |

FIG. 8

| Topographic Multipliers for Exposure C ||||||||||
| $H/L_h$ | $K_1$ Multiplier ||| $x/L_h$ | $K_2$ Multiplier || $z/L_h$ | $K_3$ Multiplier |||
|  | 2-D Ridge | 2-D Escarp. | 3-D Axisym. Hill |  | 2-D Escarp. | All Other Cases |  | 2-D Ridge | 2-D Escarp. | 3-D Axisym. Hill |
| 0.20 | 0.29 | 0.17 | 0.21 | 0.00 | 1.00 | 1.00 | 0.00 | 1.00 | 1.00 | 1.00 |
| 0.25 | 0.36 | 0.21 | 0.26 | 0.50 | 0.88 | 0.67 | 0.10 | 0.74 | 0.78 | 0.67 |
| 0.30 | 0.43 | 0.26 | 0.32 | 1.00 | 0.75 | 0.33 | 0.20 | 0.55 | 0.61 | 0.45 |
| 0.35 | 0.51 | 0.30 | 0.37 | 1.50 | 0.63 | 0.00 | 0.30 | 0.41 | 0.47 | 0.30 |
| 0.40 | 0.58 | 0.34 | 0.42 | 2.00 | 0.50 | 0.00 | 0.40 | 0.30 | 0.37 | 0.20 |
| 0.45 | 0.65 | 0.38 | 0.47 | 2.50 | 0.38 | 0.00 | 0.50 | 0.22 | 0.29 | 0.14 |
| 0.50 | 0.72 | 0.43 | 0.53 | 3.00 | 0.25 | 0.00 | 0.60 | 0.17 | 0.22 | 0.09 |
|  |  |  |  | 3.50 | 0.13 | 0.00 | 0.70 | 0.12 | 0.17 | 0.06 |
|  |  |  |  | 4.00 | 0.00 | 0.00 | 0.80 | 0.09 | 0.14 | 0.04 |
|  |  |  |  |  |  |  | 0.90 | 0.07 | 0.11 | 0.03 |
|  |  |  |  |  |  |  | 1.00 | 0.05 | 0.08 | 0.02 |
|  |  |  |  |  |  |  | 1.50 | 0.01 | 0.02 | 0.00 |
|  |  |  |  |  |  |  | 2.00 | 0.00 | 0.00 | 0.00 |

SYSTEM, METHOD AND APPARATUS FOR CAPTURING KINETIC ENERGY

CROSS REFERENCE TO RELATED APPLICATIONS

This application claims priority from U.S. Provisional Patent Application No. 61/474,666 filed on Apr. 12, 2011 and entitled "Kinetic Energy Capture Apparatus" which is incorporated herein by reference in its entirety for all purposes.

BACKGROUND

Wind and moving water energy is widely considered as one of the most cost-effective means of mega-watt scale alternative energy production. Alternative energy is a trade-off between the cost of invested capital and the cost of depletive energy resources. The depletion of world oil reserves increases the necessity to develop alternative energy. The existing technical approaches in wind turbine designs are targeted to high wind energy regimes so as to justify complex and expensive wind energy capturing systems.

Wind energy has been a frontrunner in the field of alternative energy. The capital cost per kilowatt-hour is of primary importance. The energy in the wind and moving water is cost free. The cost of systems to capture the free energy of wind and moving water are thus capital costs.

Due to the structural complexity of typical wind turbines, there is a need for a wind energy capturing system that is technologically simple and inexpensive and easily scaled to produce systems capable of producing tens of kilowatts or megawatts of electrical power.

A typical wind and water turbine has not been optimized for low velocity fluid environments and Reynolds number (less than 1,000,000) operation. Geographical areas that have exceptional high average wind velocities (e.g., above about 15 mph) have generally been identified and exploited. Further expansion of wind energy systems will use designs capable of efficiently capturing kinetic energy in wind and other fluids having a lower average velocity (e.g., less than about 15 mph). The typical approach of using a complex and expensive kinetic energy capture system will have a poor return on investment in these lower average velocity sites.

In view of the foregoing, there is a need for an inexpensive, efficient kinetic energy system capable of efficiently capturing the kinetic energy in lower average velocity fluids.

SUMMARY

Broadly speaking, the present invention fills these needs by providing inexpensive and efficient kinetic energy capture systems, methods and apparatus capable of efficiently capturing the kinetic energy in lower average velocity fluids. It should be appreciated that the present invention can be implemented in numerous ways, including as a process, an apparatus, a system, computer readable media, or a device. Several inventive embodiments of the present invention are described below.

One embodiment provides a kinetic energy capture system including a support frame, a generator supported by the support frame, a rotor assembly supported by the support frame, and a drive linking mechanism rotationally coupling the rotor assembly to the generator. The support frame secured to a support surface by at least one restraining structure. The rotor including a rotary axle substantially parallel to the support surface and at least one wing coupled to the rotary axle, the at least one wing having a coefficient of lift greater than about 1.5 and optimized for a low Reynolds number environment. Each one of the at least one wing including a leading edge, a trailing edge opposite the leading edge, a first end, a second end opposite a span of the wing from the first end, the span of the wing being parallel to the axle, an upper surface extending between the first end and the second end and between the leading edge and the trailing edge, the upper surface being a curved surface and a lower surface extending between the first end and the second end and between the leading edge and the trailing edge, the lower surface being opposite from the upper surface.

The can also include a speed reduction system coupled to the axle. The system can also include a base coupled between the support structure and the support surface. The system can also include one or more restraining structures coupled to the support structure.

The rotor can also include a first end plate coupled to the first end of each one of the at least one wing and a second end plate coupled to the second end of each one of the at least one wing, the first end plate having a corresponding first central point, the second end plate having a corresponding second central point, the rotary axle passing through the first central point and second central point to couple the at least one wing to the rotary axle.

The at least one wing can include an even number of wings evenly distributed around a corresponding first perimeter of the first end plate and around a corresponding second perimeter of the second end plate. The can include an odd number of wings evenly distributed around a corresponding first perimeter of the first end plate and around a corresponding second perimeter of the second end plate. The leading edge of each one of the at least one wing can be substantially aligned with a corresponding point on an outer perimeter of the first end plate and the second end plate.

Each one of the at least one wing can be pivotably mounted and an angle of attack actuator is coupled each one of the at least one wing, the angle of attack actuator being operable to pivoting the at least one wing to vary a corresponding angle of attack of the at least one wing. The system can also include a shadowing structure capable of shadowing at least a portion of the at least one wing at a lower most rotation of the at least one wing.

Another embodiment provides a kinetic energy capture system including a rotor assembly including multiple elongated blades, each of the elongated blades having a first end, a second end opposite the first end, a span equal to a distance between the first end and the second end, a leading edge of the span, a trailing edge of the span opposite the leading edge, a chord equal to a distance between the leading edge and the trailing edge, a centerline passing through the center of the leading edge and the center of the trailing edge and an airfoil shape having a coefficient of lift of greater than or equal to 1.5. A first end plate is connected to the first end of each of the plurality of elongated blades, the first end plate having a first end plate outer edge, a second end plate connected to the second end of each of the elongated blades, wherein the elongated blades, the second end plate having a second end plate outer edge. An axis of rotation extending through the first end plate and the second end plate, wherein the elongated blades are arranged relative to the first end plate and second endplate such that the centerline of each of the plurality of elongated blades is a selected angle of attack from a radial line extending from the axis of rotation and the leading edge of each of the elongated blades is oriented toward the first end plate outer edge and the second end plate outer edge.

The system can also include an electrical generator mechanically coupled to the rotor assembly. The system can also include a support frame for supporting the electrical generator mechanically and the rotor assembly. The system can also include a restraining structure. The system can also include a deflection structure that shadows at least one portion of the rotor assembly from a first force. The axis of rotation can be oriented substantially horizontally. The axis of rotation is oriented substantially perpendicular to a direction of a first force.

Another embodiment provides a kinetic energy capture system including one or more wings having a high coefficient of lift in a low Reynolds number environment and which leading edge of the wing or wings faces substantially in the direction of the wind or gas passing around the wing and which produces a torque on the axle of the device, one or more wings which, when rotated substantially orthogonal to the direction of the wind or gas has a high coefficient of drag, which produces a torque on the axle of the device, a rotational structure containing one or more wings suspended around the axis by end plates which are structurally connected to the axle, which axle is suspended in the wind by bearings, which bearings are supported by a structure capable of reacting the dynamic loads imparted on the wings, and which axle and rotational axis is substantially oriented horizontal to the ground, an axle connected to an electrical generator, which may include a drive train between the axle and the generator, wings of constant cross-section, which is suitable for low cost, high volume manufacturing techniques such as extrusion or forming, a support structure which is secured to stabilization system including containment vessels which may contain winds or solids such that the dynamic loads on the wings are reacted by the weight of these winds or solids, the stabilization may also contain a floatation system, a means of deflecting the wind or gas, which impinges on, the lowermost wing when the wing is oriented substantially downward and substantially orthogonal to the direction of the wind or gas.

The one or more restraining structures can be loaded with one or more weights, wherein said restraining structures secure said wind energy apparatus to said support surface. The angle of attack of the wings can be varied in relation to their angular position or the prevailing wind speed, or both. The device is used as an auxiliary power source in a vehicle. The device can be suspended on the surface of a fluid by a floatation means and prevented from substantial movement on the surface by tethers and anchor means.

Yet another embodiment provides a kinetic energy capture system including a rotor assembly including multiple elongated blades, each of the elongated blades having a first end, a second end opposite the first end, a span equal to a distance between the first end and the second end, a leading edge of the span, a trailing edge of the span opposite the leading edge, a chord equal to a distance between the leading edge and the trailing edge, a centerline passing through the center of the leading edge and the center of the trailing edge and an airfoil shape having a coefficient of lift of greater than or equal to 1.5, a first end plate connected to the first end of each of the plurality of elongated blades, the first end plate having a first end plate outer edge, a second end plate connected to the second end of each of the elongated blades, wherein the plurality of elongated blades, the second end plate having a second end plate outer edge, an axis of rotation extending through the first end plate and the second end plate, wherein the elongated blades are arranged relative to the first end plate and second endplate such that the centerline of each of the plurality of elongated blades is a selected angle of attack from a radial line extending from the axis of rotation and the leading edge of each of the elongated blades is oriented toward the first end plate outer edge and the second end plate outer edge.

The kinetic energy capture system can also include an electrical generator mechanically coupled to the rotor assembly. The kinetic energy capture system can also include a support frame for supporting the electrical generator mechanically and the rotor assembly. The kinetic energy capture system can also include a restraining structure. The kinetic energy capture system can also include a deflection structure that shadows at least one portion of the rotor assembly from a first force. The axis of rotation is oriented substantially horizontally. The axis of rotation is oriented substantially perpendicular to a direction of a first force.

Other aspects and advantages of the invention will become apparent from the following detailed description, taken in conjunction with the accompanying drawings, illustrating by way of example the principles of the invention.

BRIEF DESCRIPTION OF THE DRAWINGS

The present invention will be readily understood by the following detailed description in conjunction with the accompanying drawings.

FIG. 8 is a table comparing the performance characteristics of several wing shapes, in accordance with embodiments of the present invention.

DETAILED DESCRIPTION OF THE INVENTION

Figure 1:
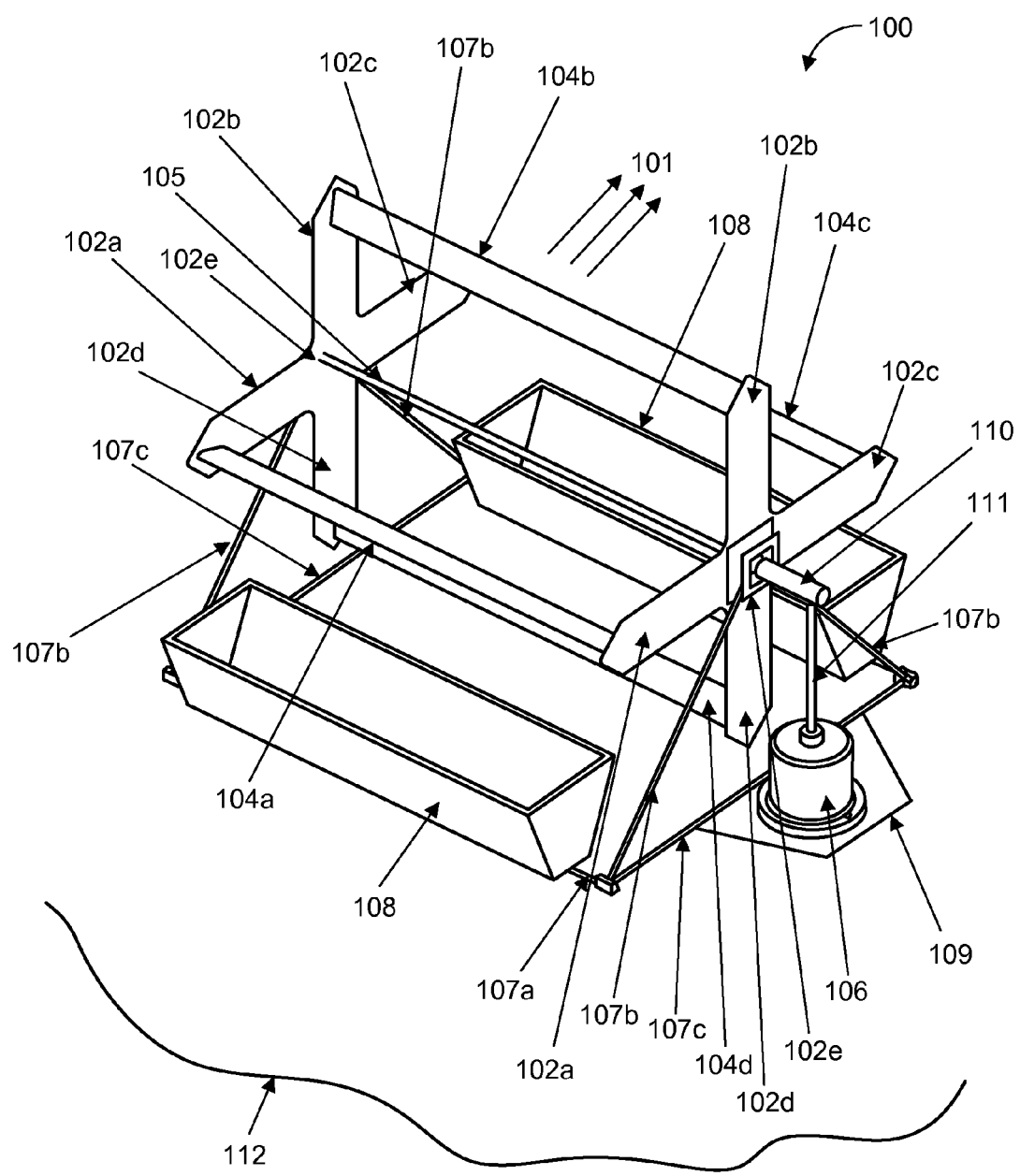
FIG. 1 is a perspective view of a kinetic energy capture apparatus, in accordance with embodiments of the present invention.

Several exemplary embodiments for inexpensive, efficient kinetic energy systems, methods and apparatus capable of efficiently capturing the kinetic energy in lower average velocity fluids will now be described. It will be apparent to those skilled in the art that the present invention may be practiced without some or all of the specific details set forth herein.

One embodiment provides a kinetic energy capture device having one or more wings having a high coefficient of lift and which leading edge of the wing or wings faces substantially in the direction of a wind or fluid passing over the wing. The wing has a high coefficient of lift in a low Reynolds fluid flow velocity. The wing(s) are connected to a rotational structure including an axle. The axle can be oriented substantially horizontally relative to the ground.

Typical wind turbine designs have many practical drawbacks. Typical wind turbines require a relatively large foundation to support the turbine. The foundation is typically built in a correspondingly large hole in the ground and includes a large reinforced steel cage. Tons of concrete are then poured into the hole to form the foundation. This is an expensive process and has a major impact on the environment due to the energy cost of production of the concrete and the dirt removal process and the production of the steel for the foundation.

The typical wind turbine also places the blades, hub, drive train, gearbox, braking system, and generator inside a nacelle structure mounted at a top portion of a tower structure. The mass of these devices in combination with aerodynamic loads requires a correspondingly massive tower structure. The typical tower structure is made of either a truss structure or large tubes of steel bolted or welded together. This massive tower structure further adds cost to the wind turbine system and again requires substantial energy to produce.

Typically, the massive tower structure is enclosed to form a tubular space used to allow maintenance personnel to climb inside a protective enclosure in the tubular tower structure. This allows access for maintenance or repair on the turbine components. All of the moving components are located in the nacelle and thus the maintenance personnel must climb the tower structure each time maintenance or repair is needed. Further, a correspondingly massive and expensive crane is required to assemble or disassemble all major components of the turbine during construction and for any major servicing.

A yaw system is typically included in the turbine. The yaw system can be passive (down-wind blades) or active (up-wind blades). The yaw system turns the nacelle and blade system in the direction of the prevailing wind. As the nacelle contains many heavy components in the wind turbine system, the yaw system must be able to support the mechanical loads and the aerodynamic loads imposed on the blade system and the mass of the heavy components. Typically, the yaw system is problematic and has less than optimal reliability. The yaw system also adds extensive costs to the wind turbine.

The rotational speed of the wind turbine blades can exceed the prevailing wind speed. This is because the blades act like a sail on a ship. That is, the apparent wind is the vector sum of the speed of the blade, plus the speed of the prevailing wind. The vector sum of these velocities is greater than the velocity of the prevailing wind alone. While this might seem to be a great advantage, it is not, because the energy available in the wind or other moving fluid is the product of the swept area of the rotor assembly and the speed of the fluid.

The electrical generator is used to react or counter-act the torque produced from the wind loading on the blades. When the electrical load (e.g., electrical power grid or other electrical load) is disconnected, the electrical generator provides less drag on the wind turbine and thus the wind turbine may go into a run-away condition. As a result, an extensive mechanical or aerodynamic braking system is required to control the speed of and stop the wind turbine or the wind turbine will begin to turn at higher rotational speeds and result in structural failure. Unfortunately, as the kinetic energy of the wind turbine's rotating mass is so high, the components in the mechanical braking system are known to wear out, allowing the run-away condition to take place. The braking system also further adds complexity and maintenance costs to the system.

A typical wind turbine also includes a gearbox to convert the torque and rotational speed at the hub of the turbine to an ideal speed and torque range for the electrical generator. Typical wind turbines experience substantial problems with the gearbox. The predominant reason for this is the asymmetric rotational loading on the input shaft of the gearbox. The reason for the asymmetric rotational loading is due to the truss or tubular tower structure, which creates a "shadow" when the axis of a blade passes substantially in the same direction as the axis of the tower. A design which avoids the tower 'shadowing' the rotor blades would thus avoid the cyclic loading of the gearbox and produce a more reliable drive train.

Typical wind turbines are also known to kill birds. In many areas, continued development of wind turbine farms is prohibited because of bird-kill. It is believed that the injury to the bird takes place when the birds fly into the swept region of the blades. The birds have limited peripheral vision and the wind turbine blades blindside the birds as the wind turbines rotate about their axis. Higher rotational tip speeds are thus worse for the birds. Existing wind turbine designs are also problematic because of interference with aviation radar systems.

In U.S. Pat. No. 4,189,280 by Dohm, Dohm's windmill creates torque around the axle using a flat planar, board-like structure, rather than an optimized aerodynamic device. This concept does not optimize the lift capability and energy capture in the prevailing wind and in particular in low wind velocities. In addition, when the board-like structure is rotated to a vertical plane, the drag coefficient is not optimized, and thus the torque applied to the axle is not optimized. The start-up speed of the device in the windmill is high because the board-like structures used to create the torque are not optimized for coefficient of lift and the aerodynamic efficiency is low.

Dohm's windmill includes a wind deflection system that appears to be a necessity, not an enhancement, as the device will not rotate without the wind deflector. Dohm's windmill relies upon the creation of a vortex in the enclosure that contains the blade assemblies. The creation of this vortex undesirably requires a complex structure.

Moreover, Dohm's windmill includes a yawing system, which necessitates a complex and expensive mechanical yaw bearing and swiveling base system to support the entire windmill structure. Dohm's yawing system also requires a rudder. Dohm's yawing system must also be secured to a substantial subterranean foundation, typically constructed of reinforced concrete, buried many tens of feet into the ground with corresponding negative environmental impacts and economic costs as described above.

Furthermore, Dohm's windmill is described as having an aerodynamic speed governing system. This necessitates multiple aerodynamic devices to actuate the aerodynamic governor and to vent the excessive wind pressure at the rear of the device. These additional braking devices have the potential to further reduce the reliability of the system, as surfaces such as these are frequently damaged or completely separated from windmills, under high wind speed conditions. In addition, Dohm's windmill is likely to oscillate without the damping provided by the aerodynamic governor system. This oscillation can potentially cause damaging vibrations within Dohm's windmill.

Dohm's windmill design requires the mechanical linkage to the generator be located centrally in the device and duplication of the board-like lift structure on each side of the generator. This design further complicates the possible chaining of several rotational structures, linked to a common generator.

FIG. 1 is a perspective view of a kinetic energy capture apparatus 100, in accordance with embodiments of the present invention. The kinetic energy capture apparatus 100 includes a rotor assembly 101, an electrical generator 106, a support frame 107, one or more restraining structures 108, a generator frame 109, a speed reduction system 110, and a drive linking mechanism 111.

The rotor assembly 101 includes a pair of end plates 102, multiple wings 104, and a rotary axle 105. The end plates 102 are spaced apart on an axis 103 of rotation of the rotor assembly 101, the axis of rotation passes through the axle 105. As exemplarily illustrated in FIGS. 1-2 and FIG. 5, each of the end plates 102 is defined by a first wing 102a, a second wing 102b, a third wing 102c, and a fourth wing 102d extending radially from a central point 102e around the axis 103 of rotation of the rotor assembly 101. It should be understood that the rotor assembly 101 can include less than four wings 102a-d (e.g., 1, 2 or 3 wings).

The axis 103 of rotation of the rotor assembly 101 passes through a central point 102e of each of the end plates 102. The end plates 102 can have a circular cross section, a triangular cross section, a square cross section, or polygonal cross-section or any other suitable shape, etc. In these embodiments, the central point 102e of each of the end plates 102 is, for example, the center of a circle, the centroid of a triangle, the center of a square etc.

The wings 104 are disposed between the end plates 102. Opposing ends 104a and 104b of each of the wings 104 can be rigidly attached to opposing spaced apart end plates 102. For example, a first end 104a of one of the wings 104 is rigidly attached to the first 102a of one of the end plates 102. A second end 104b of the wing 104 is rigidly attached to the other end plates 102. Similarly, the first end 104a of each of the other wings 104 is rigidly attached to the opposing end of the second wing 104b, the third wing 104c, and the fourth wing 104d respectively of one of the end plates 102. The second end 104b of each of the other wings 104 is rigidly attached to the opposing end plate 102 and the second wing 104b, third wing 104c, and fourth wing 104d respectively of the other one of the end plates 102. The opposing ends 104a, 104b, 104c, 104d of each of the wings 104 are rigidly attached to 102a, 102b, 102c, and 102d of the end plates 102, for example, by a weld or other suitable structural apparatus such as mechanical fasteners (bolts, screws, rivets, adhesives or by interlocking structures or combinations thereof).

Each of the wings 104 has a configuration featuring a high lift coefficient $C_l$. For example, a coefficient of lift $C_l$ exceeding 1.5 and a high drag coefficient $C_d$, when rotated largely orthogonal to a direction of the wind (or other moving fluid). A high aspect ratio wing design is preferred. However, stall of the wings 104, at typical wind speeds producing useable electrical energy, should be avoided. Although the detailed description refers to four wings 104 as exemplarily illustrated in FIGS. 1-2 and FIG. 5, the scope of the kinetic energy capture apparatus 100 disclosed herein is not limited to four wings 104 but may be extended to include two or more wings 104.

Figure 2:
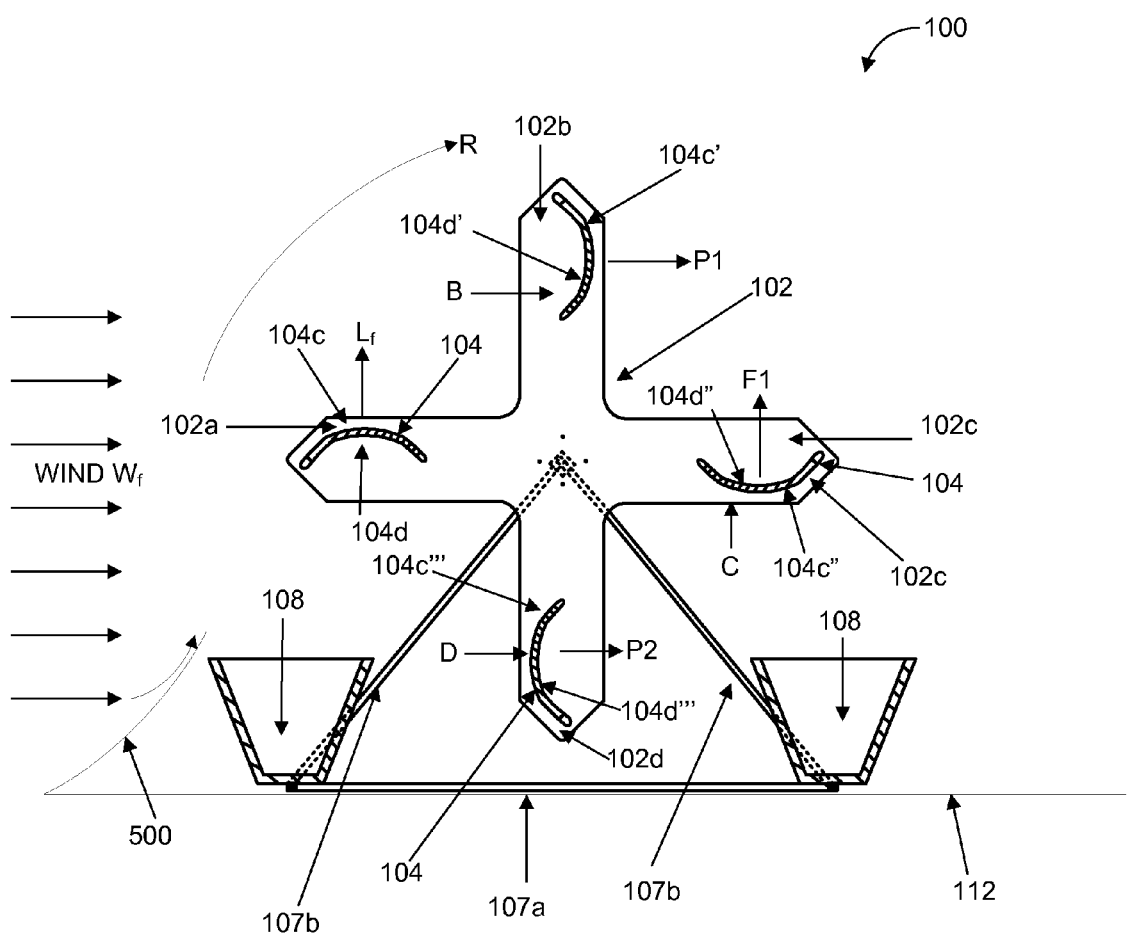
FIG. 2 is a side sectional view of the kinetic energy capture apparatus, in accordance with embodiments of the present invention.
Figure 5:
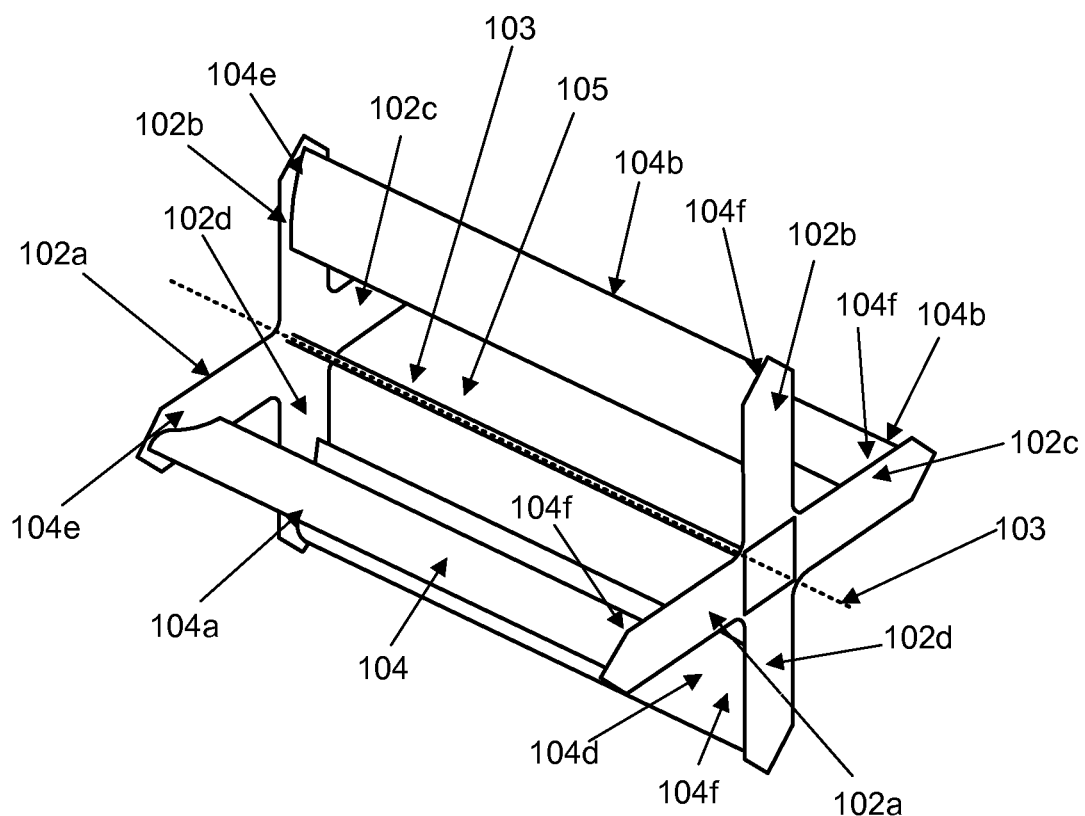
FIG. 5 is a perspective view of a rotor assembly of the kinetic energy capture apparatus, in accordance with embodiments of the present invention.

As exemplarily illustrated in FIGS. 1-2 and FIG. 5, each of the wings 104 has a generally curved cross section. The curved cross section of the wings 104 provide improved efficiency for the kinetic energy capture apparatus 100. The wings 104 may be fabricated inexpensively, as the cross section is constant across the span. Thus, a metal or polymer extrusion process or material forming or lay-up process may be employed, vastly reducing the cost of fabrication as compared to a typical wind turbine.

The span of the wings 104 can be manufactured in a continuous process and then cut to length. It should also be understood that wings and end-plates can also be fabricated or formed in an integral form, molded or formed in a single material such as polymer, polymer-composite, metal, ceramic or other suitable materials or combination thereof.

The rotary axle 105 is rigidly connected through each central point 102e of each of the end plates 102 along the axis 103 of rotation of the rotor assembly 101, for example, by a weld or other suitable connection means capable of transmitting the torque transmitted from the wings to the end-plates to the rotary axle 105. The rotor assembly 101 rotates in response to a force of wind (or other fluid moving relatively to the rotor assembly 101) on the wings 104 about the axis 103 of rotation. The rotation of the rotor assembly 101 produces mechanical energy.

Power (torque and angular speed) are transmitted from the rotary axle 105 of the kinetic energy capture apparatus 100 to an electrical generator 106 by a drive linking mechanism 111. The drive linking mechanism 111 can include one or more of a chain, multiple shafts, gears, belts, hydraulic, or other suitable mechanical linkages.

The electrical generator 106 is rotationally connected to the rotor assembly 101 by the drive linking mechanism 111. The drive linking mechanism 111 is, for example, a gearbox and torque transmitting tube as exemplarily illustrated in FIG. 1 and FIG. 4. Other drive linking mechanisms 111 for rotationally connecting the rotor assembly 101 to the electrical generator 106 can include one or more of sprockets and chains, hydraulic systems, and other torque transmitting means. The electrical generator 106 converts the mechanical energy produced by the rotation of the rotor assembly 101 to electrical energy.

An optional speed reduction system 110 can be attached to the rotary axle 105 and drive linking mechanism 111, for example, by a bearing. The electrical generator 106 can be rigidly attached to the generator frame 109, for example, by bolts, clamps, weld etc. The generator frame 109 is secured to the support frame 107, for example, by bolts, clamps etc.

The support frame 107 is rotationally connected to the rotary axle 105 of the rotor assembly 101, for example, by a bearing. The support frame 107 rigidly supports the rotor assembly 101 on a support surface 112, for example, a generally horizontal ground surface, rooftops of buildings, etc. The support frame 107 includes a base 107a and multiple struts 107b.

The base 107a can be removably attached to a support surface 112, by the restraining structures 108. The base 107a can include one or more of a solid panel, a lattice structure, etc. that provides structural rigidity to the wind energy apparatus 100. The struts 107b extend upwardly from the base 107a and are rotationally connected to the rotary axle 105, for example, by a bearing. As exemplarily illustrated in FIGS. 1-2, the struts 107b form a triangular configuration. The struts 107b may also be configured as, for example, an "A" frame, or any other suitable, stable structure.

The optional restraining structures 108 can be loaded with one or more weights, for example, dirt, sand, blocks, water or other liquid, etc. The restraining structures 108 can be removably attached to the base 107a of the support frame 107, for example, by a bolt, clamp, screws, etc. The restraining structures 108 are closed at the bottom, sides, and ends such that the weights can be readily loaded into the restraining structures 108, and readily removed if relocation of the wind energy apparatus 100 is required. The optional restraining structures 108 secure and stabilize the kinetic energy capture apparatus 100 to the support surface 112 and counteract the force of wind (or other moving fluid) against the kinetic energy capture apparatus 100. The restraining structure 108 may alternately be bolted to the support surface 112.

Covers can optionally be included for covering the open tops of the optional restraining structures 108 to prevent unauthorized removal of the weights contained in the restraining structures 108. In another embodiment, the optional restraining structures 108 can contain a drain plug for allowing the weights or winds to be readily removed from the restraining structures 108. The restraining structures 108 can be spaced apart to allow free rotation of the rotor assembly 101 between the restraining structures 108. The restraining structures 108 may provide partial shadowing of the lower most wings 104. In another embodiment, the optional restraining structures are partially or totally below the surface of the support surface 112. In an embodiment the structure 107 and optional restraining structure are secured to a pontoon or buoyancy apparatus that provides for the kinetic energy capture system 100 to float on or near the surface of a body of water. The pontoons or buoys 200 are anchored to the ground by tether lines 201.

FIG. 2 is a side sectional view of the kinetic energy capture apparatus 100, in accordance with embodiments of the present invention. When a wing 104 is in position A the first vane 102a and a force of wind $W_f$ are parallel to the support surface 112, the wing 104 operates like a standard aircraft wing. That is, the wind flows over the upper surface 104c and below the lower surface 104d of the wing 104 thereby creating an upward lift force $L_f$, which rotates the rotor assembly 101 in direction R around the rotary axle 105 about the axis 103 of rotation.

The wing 104 design can have a high coefficient of lift in position A, which for purposes of the present description is defined to be a coefficient of lift greater than or equal to about 1.5.

When a wing 104 is in position B on the second vane 104b, the force of the wind acts directly on the lower surface 104d' of the wing 104, such that the wing 104 acts as a sail. Under these conditions, a large first pushing force $P_{f1}$ is generated in the direction of the force of wind $W_f$, which further rotates the rotor assembly 101 in direction R' around the rotary axle 105. The wing 104 design can have a high coefficient of drag in position B, which for purposes of the present description is defined to be a coefficient of drag Cd greater than or equal to about 1.1. A high aspect ratio (span or length divided by cord or width) wing optimizes the aerodynamic efficiency and reduces the forces of drag at low Reynolds numbers or wind speeds.

When a wing 104 is in position C on the third vane 102c, the force of wind $W_f$ is incident on the inverted wing 104. That is, the wind flows over the lower surface 104d" and below the upper surface 104c" of the wing 104 thereby creating a relatively smaller force P1 in direction N. In the position C on the third vane 102c, the wing 104 is also in the shadow of the wing 104 in the position A on the first vane 102a, which increases the turbulence and reduces the aerodynamic forces on wing 104 in position C.

When a wing 104 is in position D on the fourth vane 102d, the force of wind is incident on the upper surface 104c''' of the wing 104. A second pushing force P2 is generated in the direction of the force of wind $W_f$. The second pushing force P2 generated is significantly less than the sum of the forces P1 and $L_f$ imparted on the wing 104. The wing 104 in position D can be partially shadowed from the force of wind $W_f$ by one of the restraining structures 108. The restraining structures 108 can be designed to shadow the wings 104 completely in the position D on the fourth vane 102d.

In addition, the force of wind $W_f$ increases with height, such that the force of wind is substantially stronger at the position B on the second vane 102b than at the position D on the fourth vane 102d, due to boundary layer effects near the level of the supporting surface 112 (also known as the ⅐th power rule). This reduction in the force of wind $W_f$ can further be accommodated by placement of the wind energy apparatus 100 behind escarpments or low-elevation wind breaks to break the force of wind.

In an embodiment, the orientation or angle of attack of the wings 104 may be varied in the positions A, B, C, and D to optimize the rotational energy about the rotary axle 105. This change in orientation may be accomplished through electrical, hydraulic or suitable mechanical linkages. The net result of the various forces is to rotate the rotor assembly 101 in the presence of any significant force of wind or other moving fluid.

Rotation of the wings 104 about the axis 103 of rotation of the rotor assembly 101 provides torque in the form of lift from a section of the wings 104 when near position A. Furthermore, torque is produced as each of the wings 104 rotates, exposing the lower surface 104d of each of the wings 104 to the wind.

A second contribution to torque is provided as drag when the wing 104 is near position B. The wings 104 continue to produce torque until, the wings 104 have rotated to nearly 180 degrees from their initial nominal position. As the wings 104 rotate further, an opposing torque may be produced, in the form of drag, with the prevailing wind now impinging on the upper surface 104c of the wings 104. However, nature provides a benefit in this regard, as wind shear produces a substantial gradient in wind speed with height or elevation above the ground. Due to wind shear, the wind speed has been demonstrated to increase with the ⅐th power rule (effectively increasing by the coefficient 1.14) as the height increases, with the wind speed starting at zero at the support surface 112. The optional containment vessels 108 can also be employed to shade the lowermost wing 104 in position D. Thus, the uppermost portions of the kinetic energy capture apparatus 100 disclosed herein is exposed to substantially greater wind speeds than those diametrically opposite and in proximity to the support surface 112 supporting the kinetic energy capture apparatus 100.

A deflection mechanism 500 can optionally be provided for deflecting the wind upwards to provide added streamlining, and thus added positive torque. The deflected wind reduces negative torque on the kinetic energy capture apparatus 100 disclosed herein. Further, the local terrain can be called upon to aid in this regard, as escarpments and small hills can be used to an advantage to deflect the wind streamlines to a greater elevation.

Figure 6:
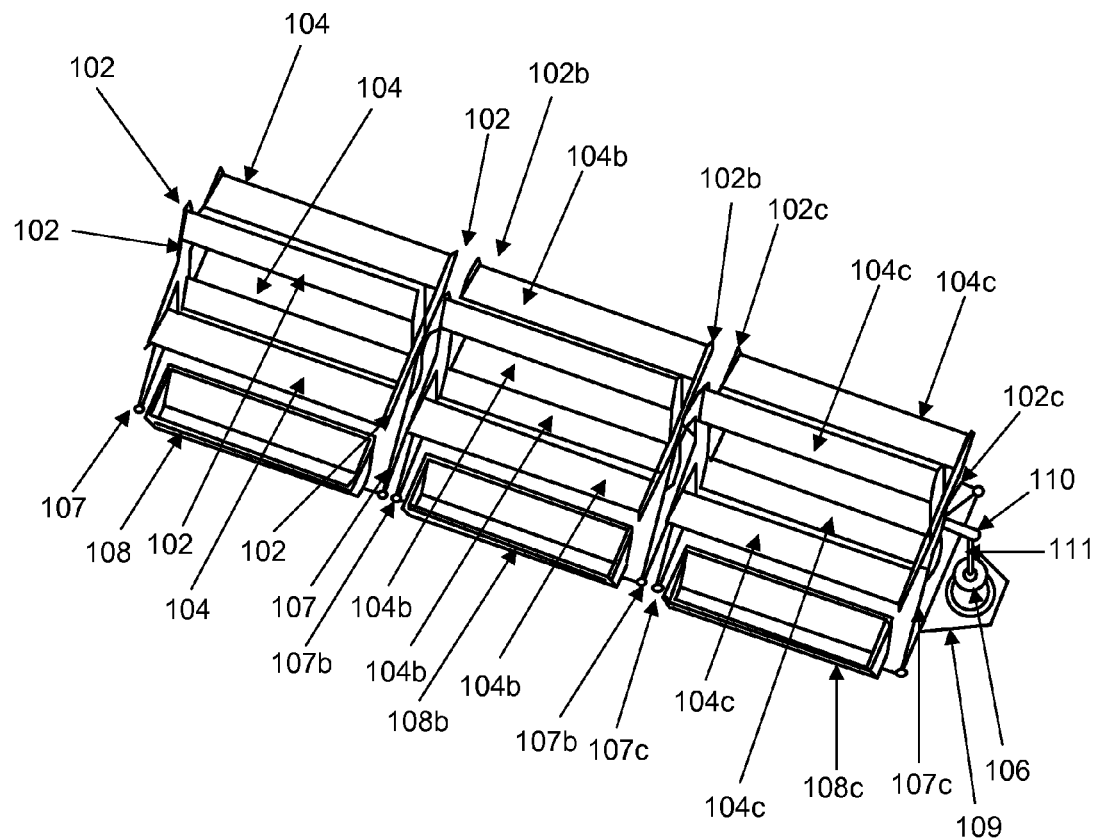
FIG. 6 is a perspective view of an embodiment of the kinetic energy capture apparatus with multiple devices coupled together, in accordance with embodiments of the present invention.

Costs for the kinetic energy capture apparatus 100 may be further reduced by connecting the rotary axles 105 of multiple wind energy apparatuses 100, in series, through the use of a suitable mechanical coupling as exemplarily illustrated in FIG. 6.

Figure 3:
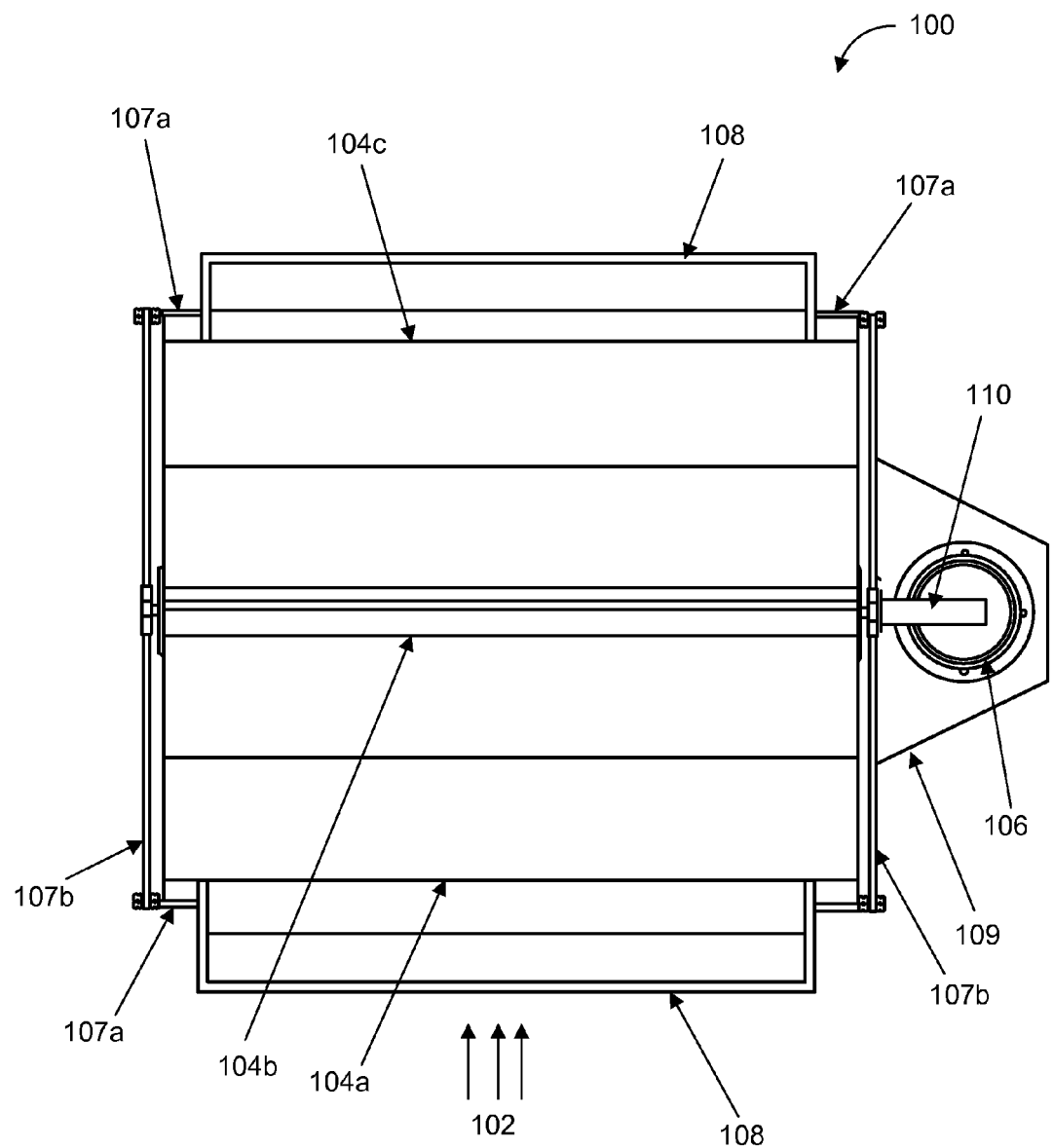
FIG. 3 is a top orthogonal view of the kinetic energy capture apparatus, in accordance with embodiments of the present invention.
Figure 4:
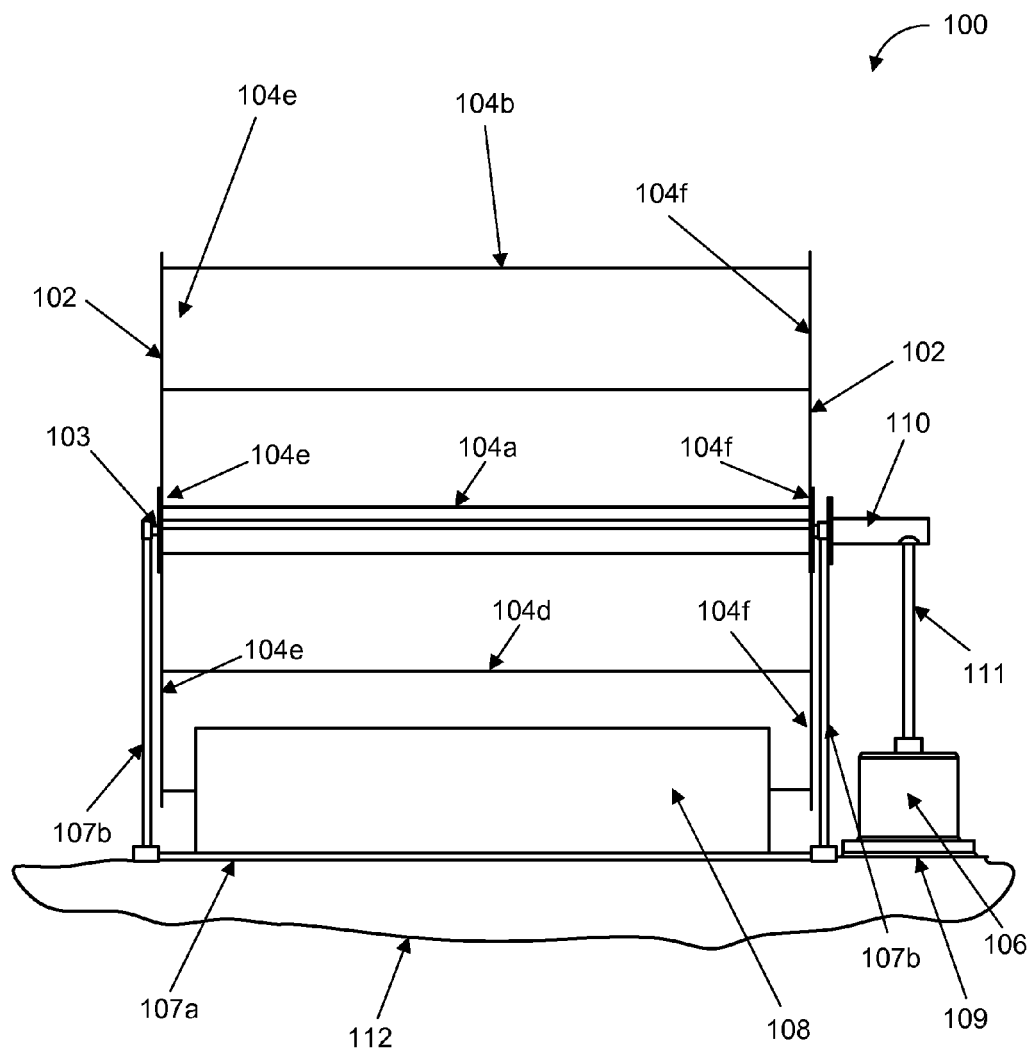
FIG. 4 is a front orthogonal view of the kinetic energy capture apparatus, in accordance with embodiments of the present invention.

FIG. 3 and FIG. 4 are a top orthogonal views and a side orthogonal view, respectively, of the wind energy apparatus 100, in accordance with embodiments of the present invention. The restraining structures 108 are removeably attached to the base 107a, for example, by a bolt, clamp etc. The electrical generator 106 and the drive linking mechanism 111 are located at an easily accessible location for maintenance and repair. The electrical generator 106 converts the mechanical energy of the rotor assembly 101 to electrical energy. The kinetic energy apparatus 100 thereby produces electrical energy. The electrical energy can be coupled to an external power consuming or storage system or coupled to a power distribution system.

Because the rotational speed of the rotor assembly 101 is limited to the prevailing wind speed and an aerodynamic stall of the wings 104 may be chosen corresponding to the angle of attack of the wings 104, a mechanical or an aerodynamic braking system is not required. The absence of this requirement reduces capital costs for and simplifies the construction of the wind energy apparatus 100. Furthermore, when the wind energy apparatus 100 is deployed in large numbers, few, if any, birds are harmed by the wind energy apparatus 100, as the wings 104 do not rotate in an orthogonal direction, relative to the force of wind.

FIG. 5 is a perspective view of the rotor assembly 101, in accordance with embodiments of the present invention. The rotor assembly 101 includes a pair of end plates 102 spaced apart on the axis 103 of rotation of the rotor assembly 101, multiple wings 104, and a rotary axle 105 as disclosed in the detailed description of FIG. 1.

FIG. 6 is a perspective view of an embodiment of the kinetic energy capture apparatus 100, in accordance with embodiments of the present invention. The kinetic energy capture apparatus 100 includes multiple rotor assemblies 101, the electrical generator 106, and the support frame 107. The rotor assemblies 101 are connected in series using a suitable mechanical coupling, for example, by gears, belt drives etc. Alternately, the rotor assemblies may share a common set of end plates.

Each of the rotor assemblies 101 includes multiple, spaced apart end plates 102, multiple wings 104, and the rotary axle 105. The end plates 102 are spaced apart on an axis 103 of rotation of the rotor assembly 101. The axis 103 of rotation of the rotor assembly 101 passes through the central point 102e of each of the end plates 102. In this embodiment, the end plates 102 are of a polygon configuration. Opposing ends 104a and 104b of each of the wings 104 are rigidly attached to opposing spaced apart end plates 102, for example, by a weld or other suitable mechanical coupling.

The rotary axle 105 is rigidly connected through each central point 102e of each of the end plates 102 along the axis 103 of rotation of the rotor assembly 101, for example, by a weld. The electrical generator 106 is rotationally connected to the rotor assembly 101.

The support frame 107 includes the base 107a and multiple struts 107b. The support frame 107 is rotationally connected to the rotary axle 105 of the rotor assembly 101, for example, by a bearing. As shown, the costs can be further reduced by connecting the multiple rotor assemblies 101 in series.

FIGS. 7A-7D are side sectional views of multiple wing shapes 104, 701, 702, 703 compared with shape of a board 701 structure of a kinetic energy capture apparatus 100, in accordance with embodiments of the present invention. An aerodynamic comparison serves to contrast the lifting force of various lifting shapes 701-703, 104. The aerodynamic comparison is provided to demonstrate the contrast between the high-lift wing, optimized through the use of computational wind dynamics for low wind speeds and a flat board like lifting structure 701.

Each of the shapes 701-703, a potential wing geometry 104 is compared under equivalent parameters: That is for 701-703, each has a cord of about 4.0 ft (1.33 m), a span of about 8 ft (2.66 m) and the lift is calculated at a wind speed of 15 miles per hour. The cord of a wing is the distance from the tip of the leading edge to the tip of the trailing edge. The span of the wing 104 is the width of the wing from a first end to an opposite second end of the wing 104. The camber of the wing 104 is the thickness of the wing from the top surface 104c to the lower surface 104d. Angle of attack is the angle α between the cord of the wing and the direction of the prevailing wind or fluid.

Figure 7A:
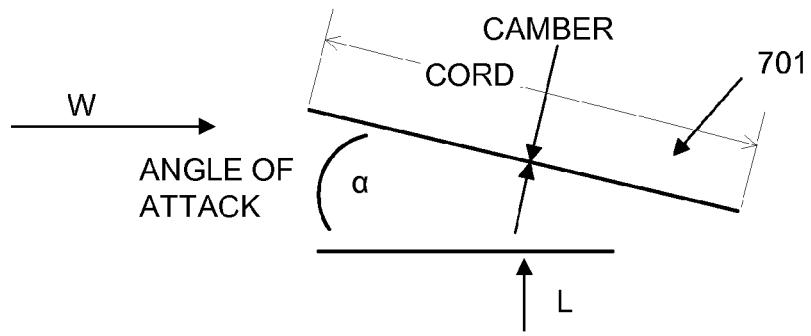
FIGS. 7A-7D are side sectional views of multiple wing shapes compared with shape of a board structure of a kinetic energy capture apparatus, in accordance with embodiments of the present invention.
Figure 7B:
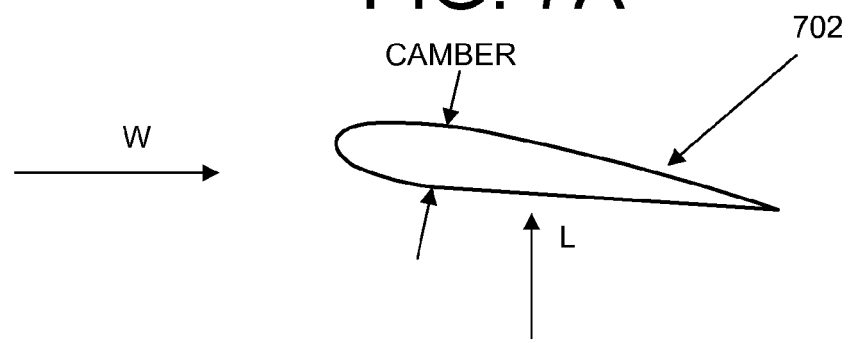

FIG. 7B exemplarily illustrates a standard Joukowsky airfoil 702 at an angle of attack a of zero. A Joukowsky airfoil is term used in aerodynamic modeling that refers to a common technique to create a conformal map of chosen airfoil. The Joukowsky transform uses potential or non-compressive flow modeling (which is appropriate at low Reynolds numbers) to produce lift and drag characteristics for an airfoil or wing using arbitrary, user defined geometry for the wing.

Figure 7C:
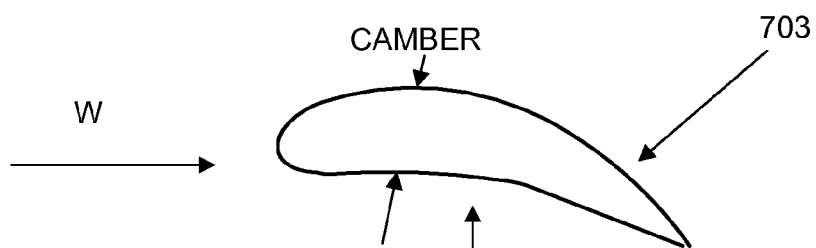

FIG. 7C illustrates an optimized Joukowsky wing 703, where the angle of attack α and the camber are optimized to produce the greatest lift force.

Figure 7D:
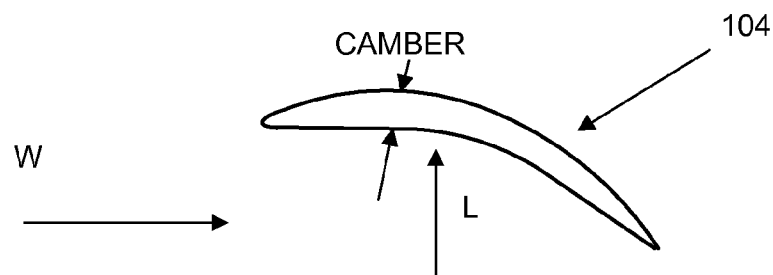

FIG. 7D illustrates the wing 104, used in kinetic energy capture device 100. The wing 104 is further optimized not only for lifting force, but also for the least manufacturing cost, characterized by a reduced thickness as a percent of the chord, to create a shell-like structure that is easy to manufacture.

FIG. 8 is a table 800 comparing the performance characteristics of several wing shapes, in accordance with embodiments of the present invention. Table 800 provides an aerodynamic contrast of the lifting shapes disclosed in FIGS. 7A-7D above to demonstrate how progressive optimization of the lifting structure, from board-like structure 701 to wing 104 increases the total lifting force and can be made to reduce manufacturing cost. Each of the lifting structures 701, 702, 703 and 104, is analyzed in an identical airflow field of 15 miles per hour and has identical surface area (cord multiplied by span). The optimized wing 104 generates forty-five pound lifting force as compared to the eighteen pound lifting force of the board like structure 701, a factor of 2.5 produced by optimizing the lifting structure or wing in a prevailing low velocity wind field of 15 miles per hour.

Figure 9:
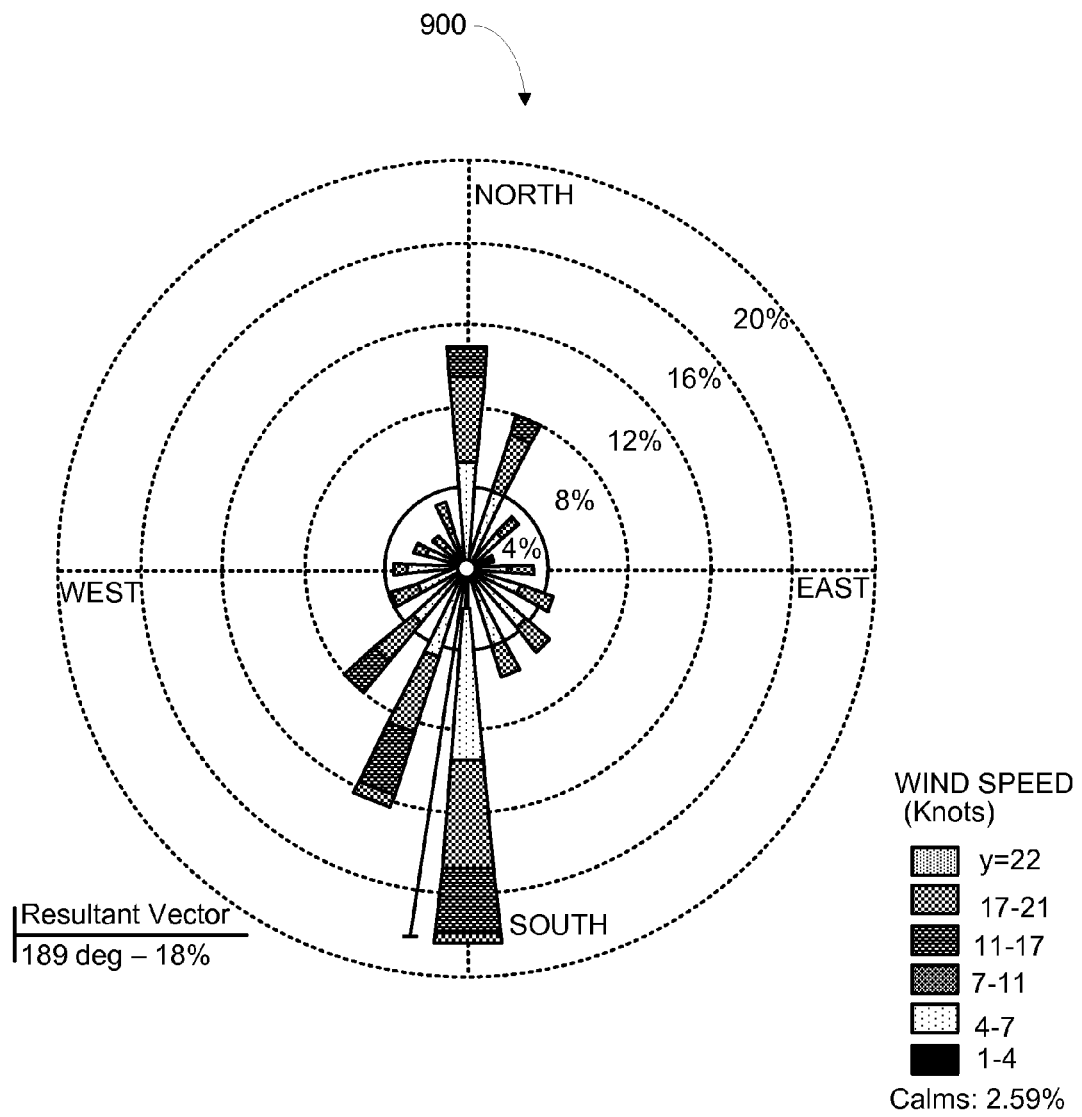
FIG. 9 is a graph of a wind rose, in accordance with embodiments of the present invention.

FIG. 9 is a wind rose 900, in accordance with embodiments of the present invention. The wind rose 900 used for orienting the kinetic energy capture apparatus 100 in a direction of maximum force of wind. The wind rose 900 is a plot of the direction and frequency of prevailing winds at a given wind location. The wind rose 900 for typical wind turbine sites shows that the majority of the wind energy velocity is located in a very narrow angular direction. This makes good scientific sense, in that the wind is generated by thermal gradients, which are typically produced by temperature differentials between a warm body of land and body of water or cooler land. Wind will flow like water through valleys or passages. These valleys or passages are typically where wind turbines are located. These thermal patterns persists in nature. Because the wind typically flows through these valleys or passages in a consistent pattern or vector, it is clear the need for a yaw system is minimal. Further, the use of a high aspect ratio wing minimizes the influence of wind direction high on total energy produced by wings 104 of the rotor assembly 101 of the wind energy apparatus 100 can eliminate the requirement for a system to yaw the wind energy apparatus 100.

Figure 10:
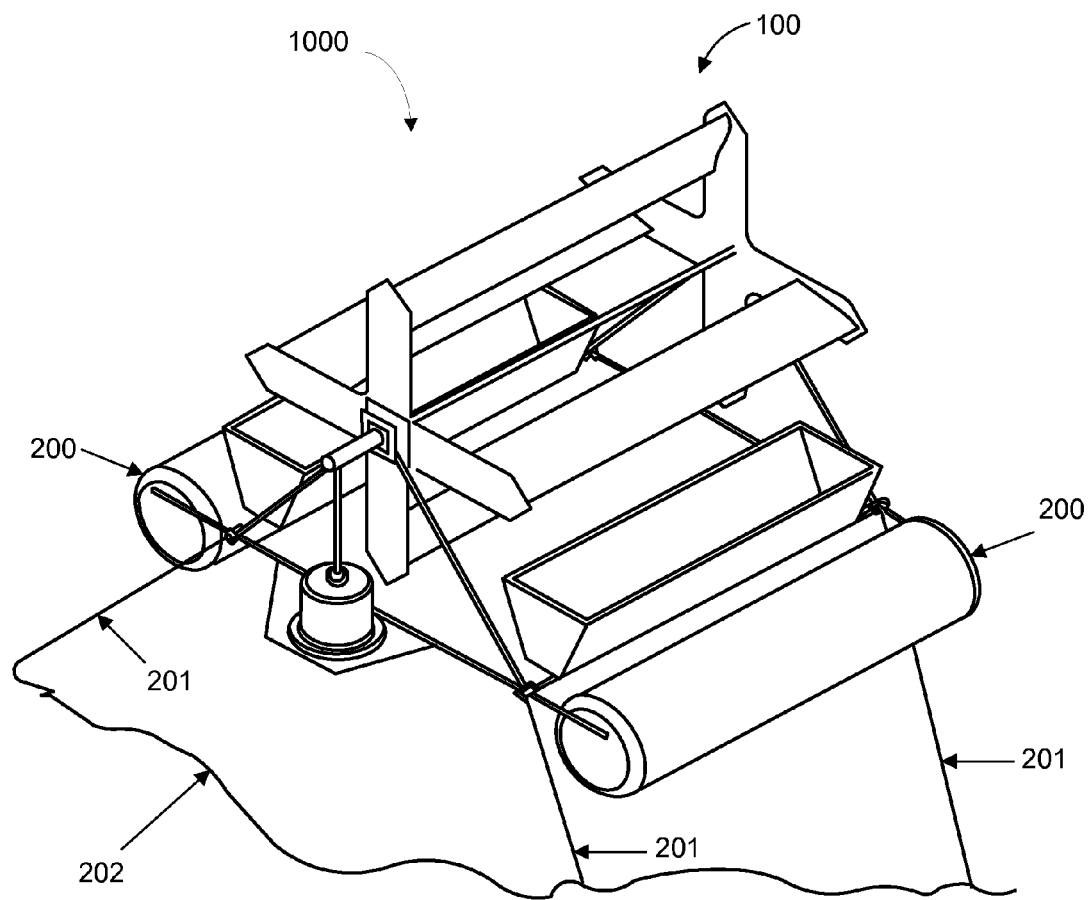
FIG. 10 is a kinetic energy capture system in a floating application, in accordance with embodiments of the present invention.

FIG. 10 is a floatable combination 1000 of the kinetic energy capture device 100 and a floatation system 200, in accordance with embodiments of the present invention. The floatable combination 1000 can readily be operated in an off-shore configuration. The floatation system 200 can be pontoons or buoys, which are suitably secured to the structure of the kinetic energy capture device 100 through suitable fastening or welding means. The kinetic energy capture device 100 or floatation system 200 can be tethered or anchored using suitable tethers 201 to the ocean floor or lake floor, and the floatable combination 1000 floats on the surface of the water 202.

Figure 11:
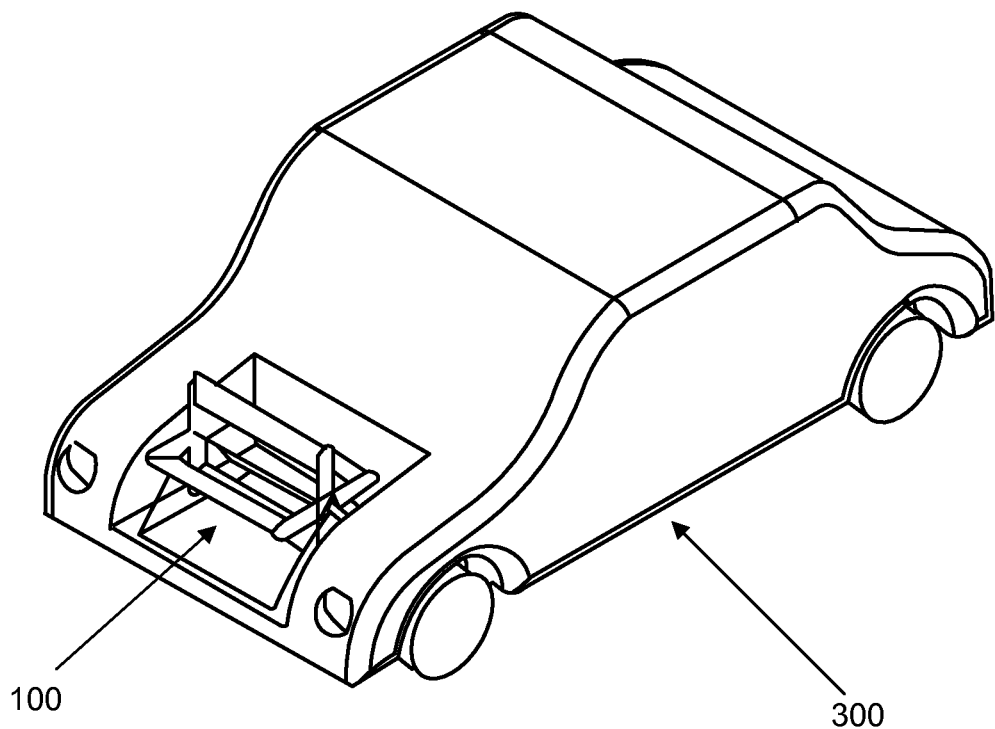
FIG. 11 is a kinetic energy capture system provided as an auxiliary source of power generation on a vehicle such as an automobile or ship, in accordance with embodiments of the present invention.

FIG. 11 is a kinetic energy capture system 100 provided as an auxiliary source of power generation on a vehicle 300 such as an automobile or ship, in accordance with embodiments of the present invention. The kinetic energy capture device 100 can be located in the vehicle such that over-all drag of the vehicle is not substantially increased and electrical power can be produced by kinetic energy of the wind that would otherwise be lost.

Figure 12:
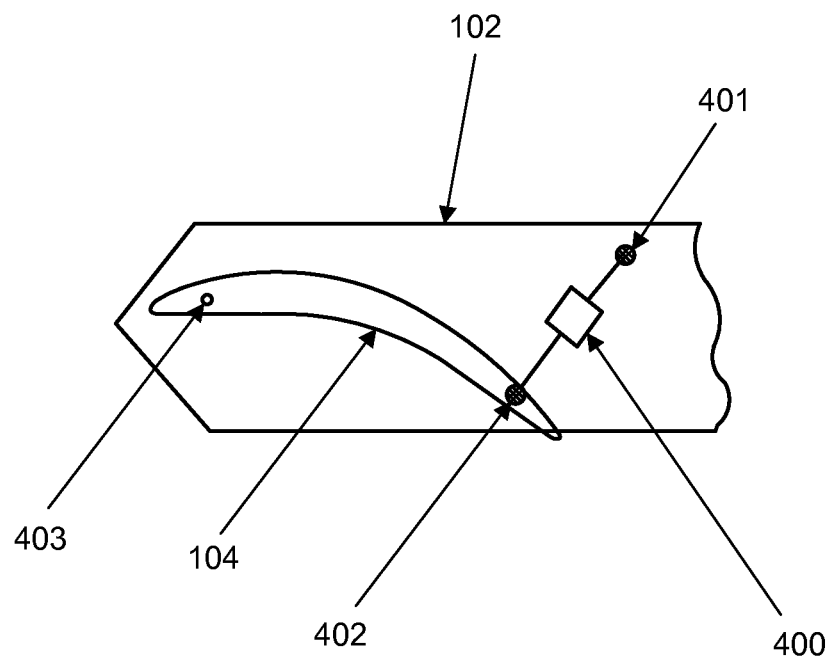
FIG. 12 is a kinetic energy capture system with an angle of attack actuator coupled to the wind structure, in accordance with embodiments of the present invention.

FIG. 12 is a kinetic energy capture system 100 with an angle of attack actuator 400 coupled to the wing structure 104, in accordance with embodiments of the present invention. The angle of attack actuator 400 may be electrical, electro-mechanical or hydraulic or any other suitable motive means. The angle of attack actuator 400 is secured at one end to the end plate 102 and the other end is secured to the wing 104 at pivot-point 402. The wing 104 pivots about point 403, which is secured to wing end plate 102 and is allowed to rotate by a suitable bearing means.

Figure 13:
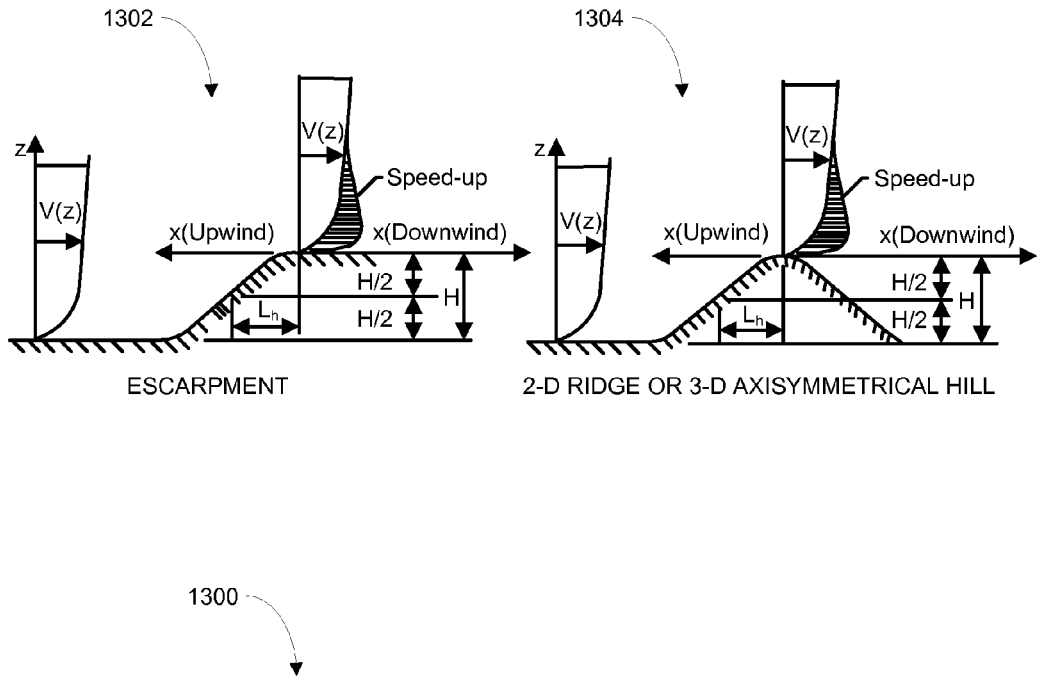
FIG. 13 is a table describing advantages of an escarpment placement, in accordance with embodiments of the present invention.

FIG. 13 is a table 1300 describing advantages of an escarpment 1302 placement or hill 1304 placement, in accordance with embodiments of the present invention. For a value of $H/L_h$, $x/L_h$ and $z/L_h$ other than those shown, linear interpolation is permitted. For $H/L_h > 0.5$, assume $H/L_h = 0.5$ for evaluating $K_1$, and substitute 2H for $L_h$ for evaluating $K_2$ and $K_3$. Multipliers are based on the assumption that wind approached the hill or escarpment along the direction of maximum slope. H refers to the Height of hill or escarpment relative to the upwind terrain, in feet (meters). $L_h$ is the Distance upwind of crest to where the difference in ground elevation is half the height of hill or escarpment, in feet (meters). $K_1$ is the factor to account for shape of topographic feature and maximum speed-up effect. $K_2$ is the factor to account for reduction in speed-up with distance upwind or downwind of crest. $K_3$ is the factor to account for reduction in speed-up with height above local terrain. X is that distance (upwind or downwind) from the crest to the building site, in feet (meters). Z is the height above local ground level, in feet (meters).

The kinetic energy capture system 100 disclosed herein minimizes or eliminates many of the major costs of the typical wind turbine, as the kinetic energy capture system 100 does not require a yaw mechanism or a braking system, allows for the electrical generator 106 to be located at ground level, requires no massive tower structure, allows for a simple and cost-effective airfoil or wings design, requires only a single electrical generator 106 and does not require a typical subterranean foundation or set of footings and further may be provided with a floatation and stabilization system such that it could be easily moored in an off-shore location.

The kinetic energy capture system 100 disclosed herein makes primary reference to wind or air as the source of kinetic energy. However, it is understood that the principles of kinetic energy capture contained herein apply equally to other fluids containing kinetic energy, for example moving water.

The foregoing examples have been provided merely for the purpose of explanation and are in no way to be construed as limiting of the present invention disclosed herein. While the invention has been described with reference to various embodiments, it is understood that the words, which have been used herein, are words of description and illustration, rather than words of limitation. Further, although the invention has been described herein with reference to particular means, materials and embodiments, the invention is not intended to be limited to the particulars disclosed herein; rather, the invention extends to all functionally equivalent structures, methods and uses, such as are within the scope of the appended claims. Those skilled in the art, having the benefit of the teachings of this specification, may effect numerous modifications thereto and changes may be made without departing from the scope and spirit of the invention in its aspects.

I claim:

1. A kinetic energy capture system comprising:
a support frame, the support frame secured to a support surface by at least one restraining structure;
a generator supported by the support frame;
a rotor assembly supported by the support frame; and
a drive linking mechanism rotationally coupling the rotor assembly to the generator;
the rotor including:
a rotary axle substantially parallel to the support surface; and
at least one wing coupled to the rotary axle, the at least one wing having a coefficient of lift greater than about 1.5 and optimized for a low Reynolds number environment, each one of the at least one wing including:
a leading edge;
a trailing edge opposite the leading edge;
a first end;
a second end opposite a span of the wing from the first end, the span of the wing being parallel to the axle;
an upper surface extending between the first end and the second end and between the leading edge and the trailing edge, the upper surface being a curved surface;
a lower surface extending between the first end and the second end and between the leading edge and the trailing edge, the lower surface being opposite from the upper surface;
a first end plate coupled to the first end of each one of the at least one wing; and
a second end plate coupled to the second end of each one of the at least one wing, the first end plate having a corresponding first central point, the second end plate having a corresponding second central point, the rotary axle passing through the first central point and second central point to couple the at least one wing to the rotary axle.

2. The system of claim 1, further comprising a speed reduction system coupled to the axle.

3. The system of claim 1, further comprising a base coupled between the support structure and the support surface.

4. The system of claim 1, further comprising one or more restraining structures coupled to the support structure.

5. The system of claim 1, wherein the at least one wing includes an even number of wings evenly distributed around a corresponding first perimeter of the first end plate and around a corresponding second perimeter of the second end plate.

6. The system of claim 1, wherein the at least one wing includes an odd number of wings evenly distributed around a corresponding first perimeter of the first end plate and around a corresponding second perimeter of the second end plate.

7. The system of claim 1, wherein the leading edge of each one of the at least one wing is substantially aligned with a corresponding point on an outer perimeter of the first end plate and the second end plate.

8. The system of claim 1, wherein each one of the at least one wing is pivotably mounted and an angle of attack actuator is coupled each one of the at least one wing, the angle of attack actuator being operable to pivoting the at least one wing to vary a corresponding angle of attack of the at least one wing.

9. The system of claim 1, further comprising a shadowing structure capable of shadowing at least a portion of the at least one wing at a lower most rotation of the at least one wing.

10. A kinetic energy capture system comprising:
   a rotor assembly including:
      a plurality of elongated blades, each of the plurality of elongated blades having:
         a first end;
         a second end opposite the first end;
         a span equal to a distance between the first end and the second end;
         a leading edge of the span;
         a trailing edge of the span opposite the leading edge, a chord equal to a distance between the leading edge and the trailing edge;
         a centerline passing through the center of the leading edge and the center of the trailing edge; and
         an airfoil shape having a coefficient of lift of greater than or equal to 1.5;
      a first end plate coupled to the first end of each of the plurality of elongated blades, the first end plate having a first end plate outer edge;
      a second end plate coupled to the second end of each of the plurality of elongated blades, wherein the plurality of elongated blades, the second end plate having a second end plate outer edge, the first end plate having a corresponding first central point, the second end plate having a corresponding second central point; and
      an axis of rotation extending through the first end plate and the second end plate, the axis of rotation passing through the first central point and second central point, wherein the plurality of elongated blades are arranged relative to the first end plate and second endplate such that the centerline of each of the plurality of elongated blades is a selected angle of attack from a radial line extending from the axis of rotation and the leading edge of each of the plurality of elongated blades is oriented toward the first end plate outer edge and the second end plate outer edge.

11. The system of claim 10, further comprising an electrical generator mechanically coupled to the rotor assembly.

12. The system of claim 11, further comprising a support frame for supporting the electrical generator mechanically and the rotor assembly.

13. The system of claim 12, further comprising a restraining structure.

14. The system of claim 10, further comprising a deflection structure that shadows at least one portion of the rotor assembly from a first force.

15. The system of claim 10, wherein the axis of rotation is oriented substantially horizontally.

16. The system of claim 10, wherein the axis of rotation is oriented substantially perpendicular to a direction of a first force.

17. A kinetic energy capture system comprising:
   one or more wings having a high coefficient of lift in a low Reynolds number environment and which leading edge of the wing or wings faces substantially in the direction of the wind or gas passing around the wing and which produces a torque on the axle of the device;
   one or more wings which, when rotated substantially orthogonal to the direction of the wind or gas has a high coefficient of drag, which produces a torque on the axle of the device;
   a rotational structure containing one or more wings suspended around the axis by end plates which are structurally connected to the axle, which axle is suspended in the wind by bearings, which bearings are supported by a structure capable of reacting the dynamic loads imparted on the wings, and which axle and rotational axis is substantially oriented horizontal to the ground;
   an axle connected to an electrical generator, which may include a drive train between the axle and the generator;
   wings of constant cross-section, which is suitable for low cost, high volume manufacturing techniques such as extrusion or forming;
   a support structure which is secured to stabilization system including containment vessels which may contain winds or solids such that the dynamic loads on the wings are reacted by the weight of these winds or solids, the stabilization may also contain a floatation system;
   a means of deflecting the wind or gas, which impinges on, the lowermost wing when the wing is oriented substantially downward and substantially orthogonal to the direction of the wind or gas.

18. The kinetic energy capture system of claim 17, wherein one or more restraining structures loaded with one or more weights, wherein said restraining structures secure said wind energy apparatus to said support surface.

19. The kinetic energy capture system of claim 17, wherein, the angle of attack of the wings can be varied in relation to their angular position or the prevailing wind speed, or both.

20. The kinetic energy capture system of claim 17, wherein, the device is used as an auxiliary power source in a vehicle.

21. The kinetic energy capture system of claim 17, wherein the device is suspended on the surface of a fluid by a floatation means and prevented from substantial movement on the surface by tethers and anchor means.

22. A kinetic energy capture system comprising:
   a rotor assembly including:
      a plurality of elongated blades, each of the plurality of elongated blades having:
         a first end;
         a second end opposite the first end;
         a span equal to a distance between the first end and the second end;
         a leading edge of the span;
         a trailing edge of the span opposite the leading edge, a chord equal to a distance between the leading edge and the trailing edge;
         a centerline passing through the center of the leading edge and the center of the trailing edge; and
         an airfoil shape having a coefficient of lift of greater than or equal to two;
      a first end plate coupled to the first end of each of the plurality of elongated blades, the first end plate having a first end plate outer edge;
      a second end plate coupled to the second end of each of the plurality of elongated blades, wherein the plurality of elongated blades, the second end plate having a second end plate outer edge, the first end plate having a corresponding first central point, the second end plate having a corresponding second central point; and;

an axis of rotation extending through the first end plate and the second end plate, the axis of rotation passing through the first central point and second central point, wherein the plurality of elongated blades are arranged relative to the first end plate and second endplate such that the centerline of each of the plurality of elongated blades is a selected angle of attack from a radial line extending from the axis of rotation and the leading edge of each of the plurality of elongated blades is oriented toward the first end plate outer edge and the second end plate outer edge.

23. The kinetic energy capture system of claim 22, further comprising an electrical generator mechanically coupled to the rotor assembly.

24. The kinetic energy capture system of claim 23, further comprising a support frame for supporting the electrical generator mechanically and the rotor assembly.

25. The kinetic energy capture system of claim 24, further comprising a restraining structure.

26. The kinetic energy capture system of claim 22, further comprising a deflection structure that shadows at least one portion of the rotor assembly from a first force.

27. The kinetic energy capture system of claim 22, wherein the axis of rotation is oriented substantially horizontally.

28. The kinetic energy capture system of claim 22, wherein the axis of rotation is oriented substantially perpendicular to a direction of a first force.

* * * * *